United States Patent
Daishi et al.

(10) Patent No.: US 9,810,936 B2
(45) Date of Patent: Nov. 7, 2017

(54) DISPLAY PANEL

(71) Applicant: Japan Display Inc., Minato-ku (JP)

(72) Inventors: Kazuya Daishi, Tokyo (JP); Tetsuya Iizuka, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/018,827

(22) Filed: Sep. 5, 2013

(65) Prior Publication Data

US 2014/0071389 A1    Mar. 13, 2014

(30) Foreign Application Priority Data

Sep. 7, 2012 (JP) ................................. 2012-197759

(51) Int. Cl.
| | |
|---|---|
| *G02F 1/1333* | (2006.01) |
| *G02F 1/1339* | (2006.01) |
| *G02F 1/1337* | (2006.01) |
| *G02F 1/1345* | (2006.01) |

(52) U.S. Cl.
CPC ...... *G02F 1/133345* (2013.01); *G02F 1/1337* (2013.01); *G02F 1/1339* (2013.01); *G02F 1/1345* (2013.01)

(58) Field of Classification Search
CPC .............. G02F 1/1339; G02F 1/1345; G02F 1/133345; G02F 1/1337; G02F 1/13452
See application file for complete search history.

(56) References Cited

U.S. PATENT DOCUMENTS

| | | | |
|---|---|---|---|
| 2003/0123015 A1* | 7/2003 | Park ..................... | G02F 1/1345 349/149 |
| 2010/0283931 A1* | 11/2010 | Horiuchi et al. ............... | 349/46 |
| 2013/0003006 A1* | 1/2013 | Wang et al. .................. | 349/138 |

FOREIGN PATENT DOCUMENTS

| | | |
|---|---|---|
| CN | 101706631 A | 5/2010 |
| JP | 2001-337334 | 12/2001 |
| JP | 2008-262796 | 10/2008 |
| JP | 2009-116116 | 5/2009 |

OTHER PUBLICATIONS

Japanese Office Action issued Jun. 21, 2016 in Japanese Patent Application No. 2012-197759 with English translation, 8 pages.

* cited by examiner

*Primary Examiner* — Jessica M Merlin
(74) *Attorney, Agent, or Firm* — Oblon, McClelland, Maier & Neustadt, L.L.P.

(57) ABSTRACT

According to one embodiment, a display panel includes an array substrate and a counter substrate. The array substrate includes an inorganic insulating film, a first wiring line, a second wiring line, an organic insulating film, a slit and a moisture-proof member. The slit is formed to extend through the organic insulating film between the first wiring line and the second wiring line. The moisture-proof member is filled in the slit and is in contact with the inorganic insulating film.

9 Claims, 16 Drawing Sheets

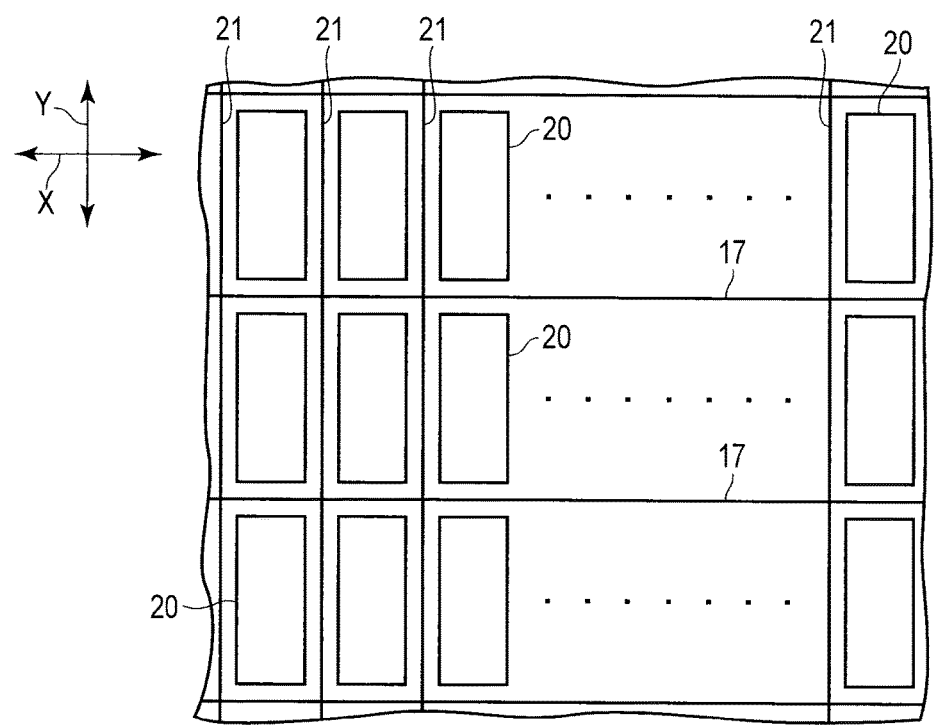
F I G. 4

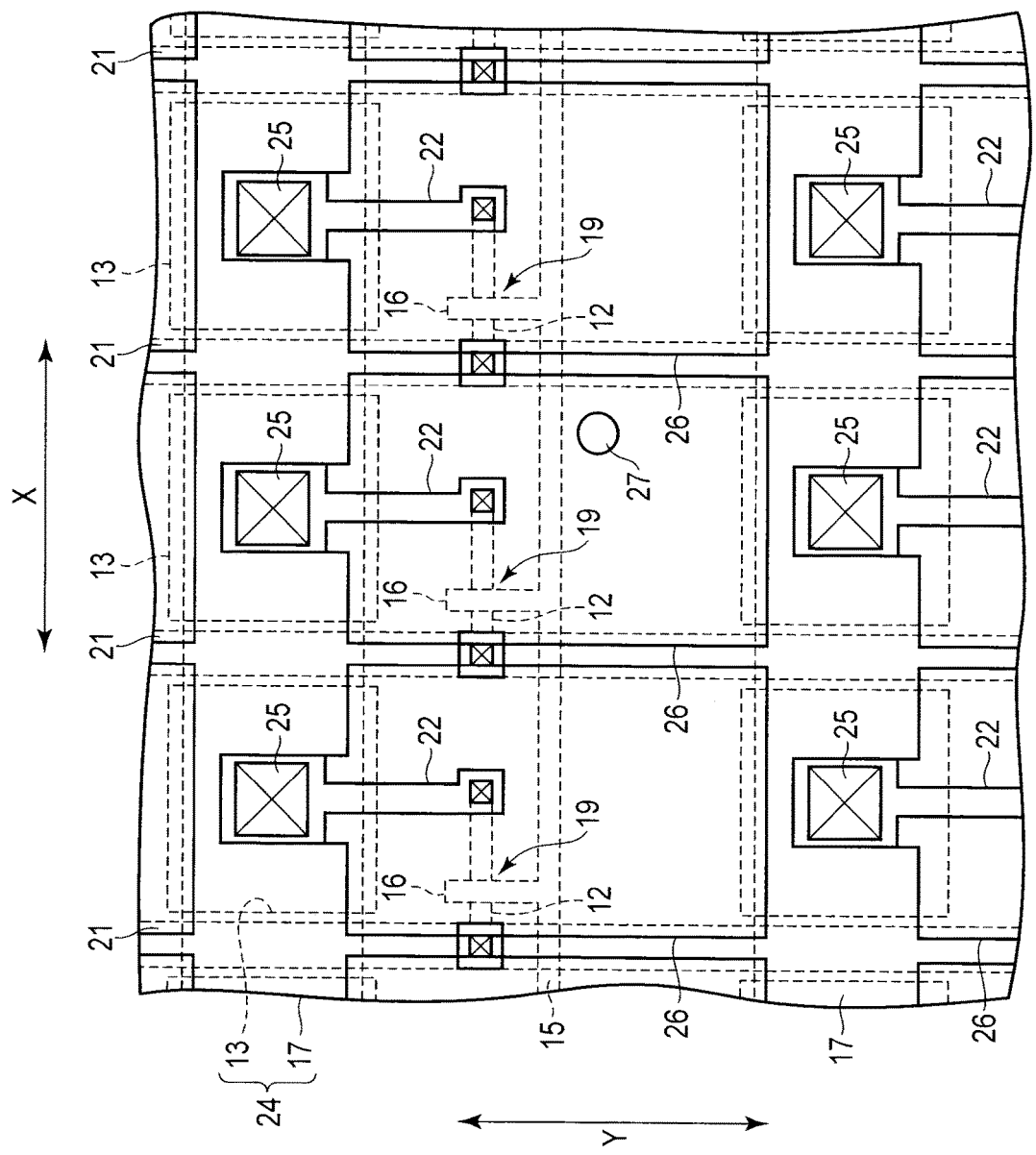
F I G. 5

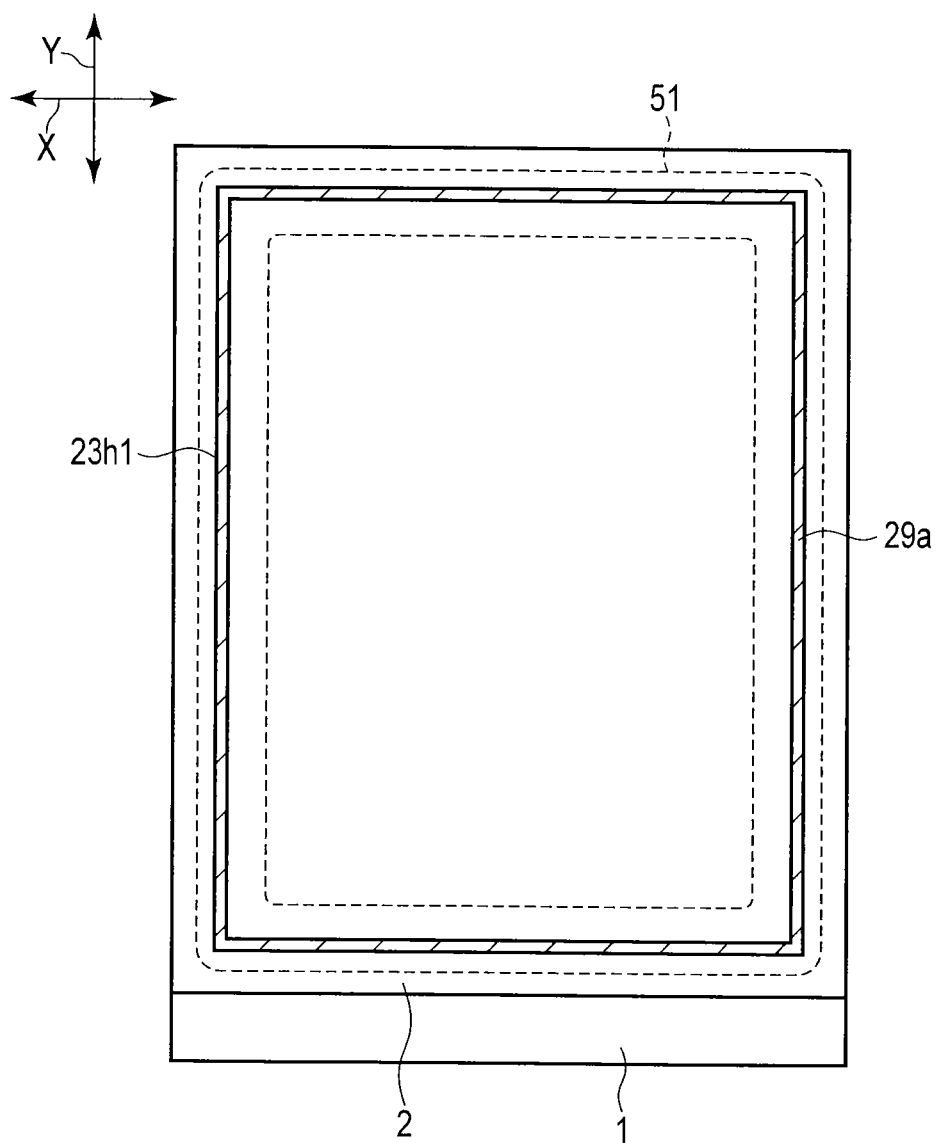
F I G. 8

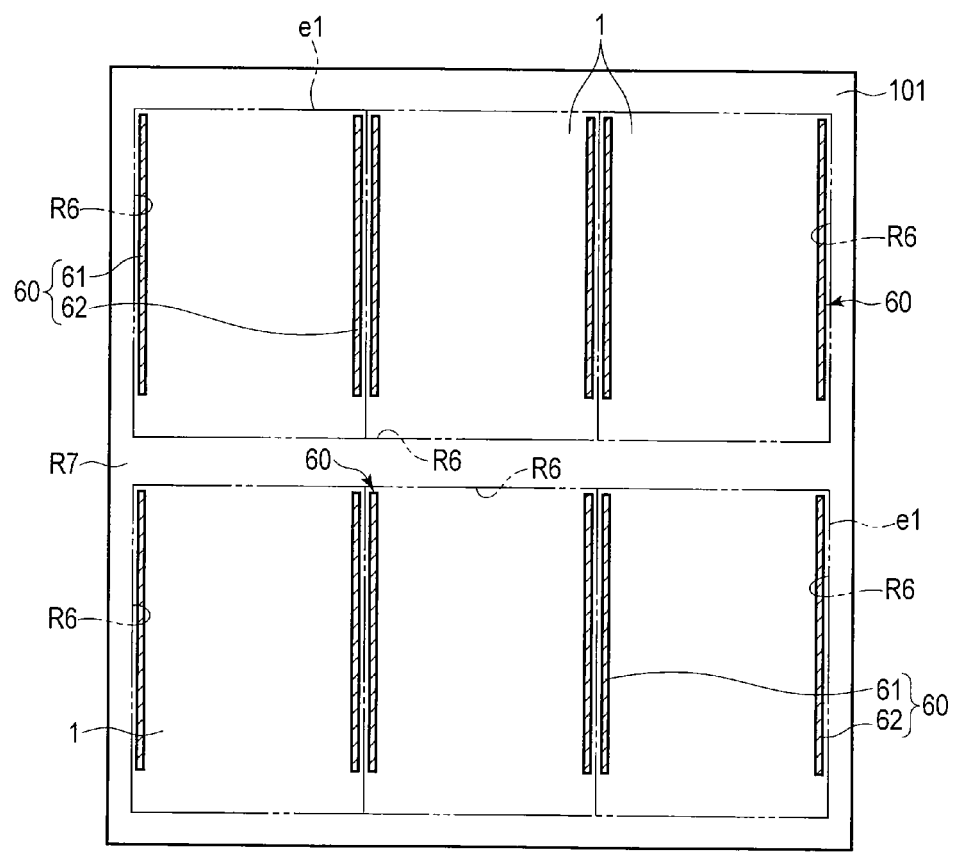
F I G. 10

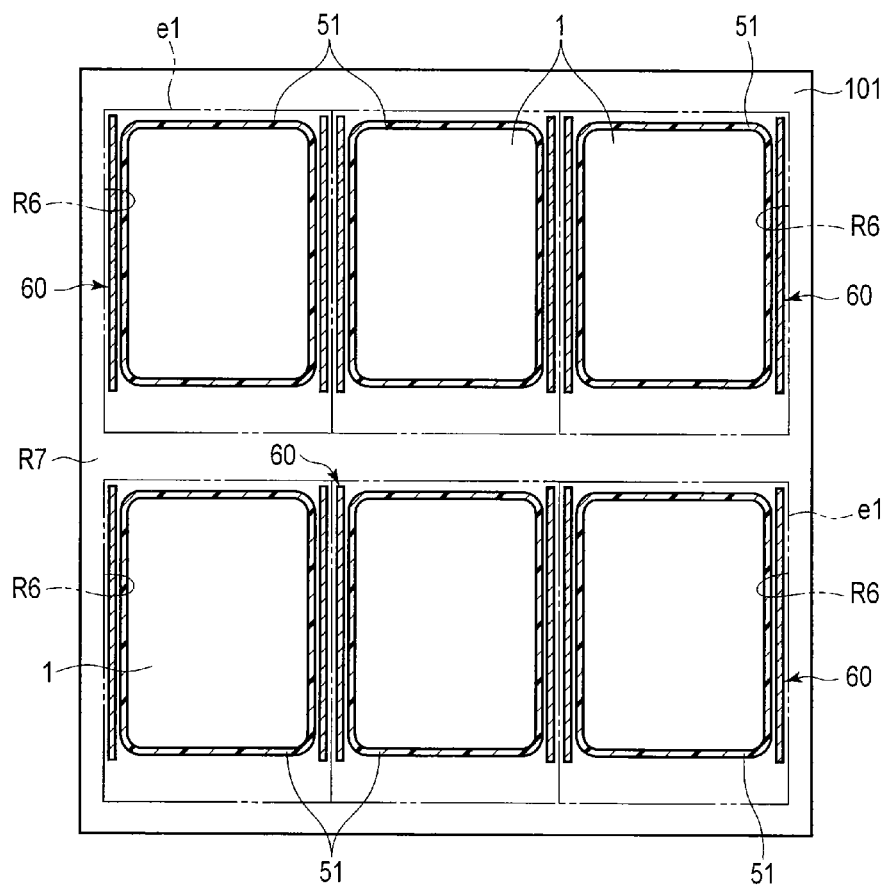
F I G. 12

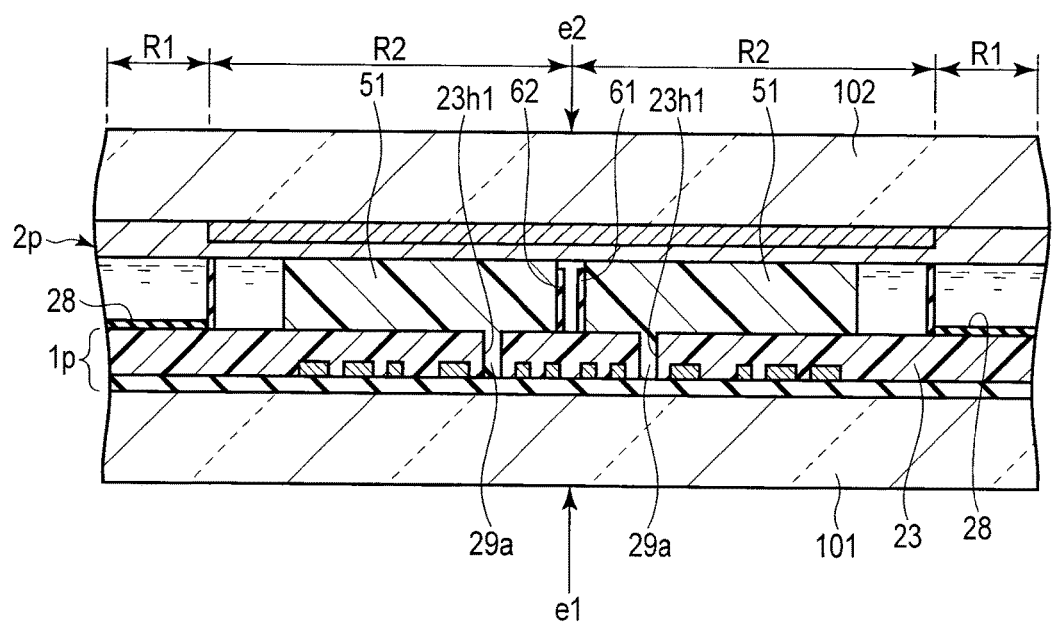
F I G. 14

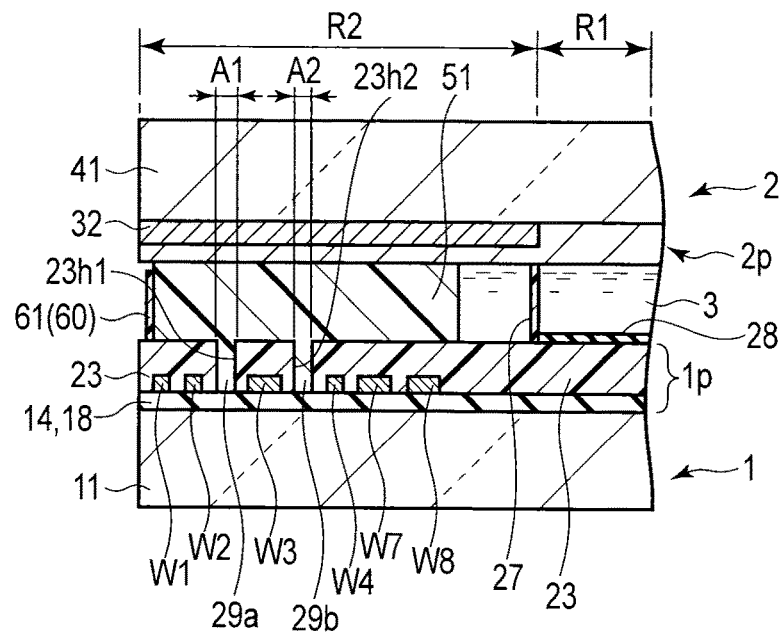
F I G. 16
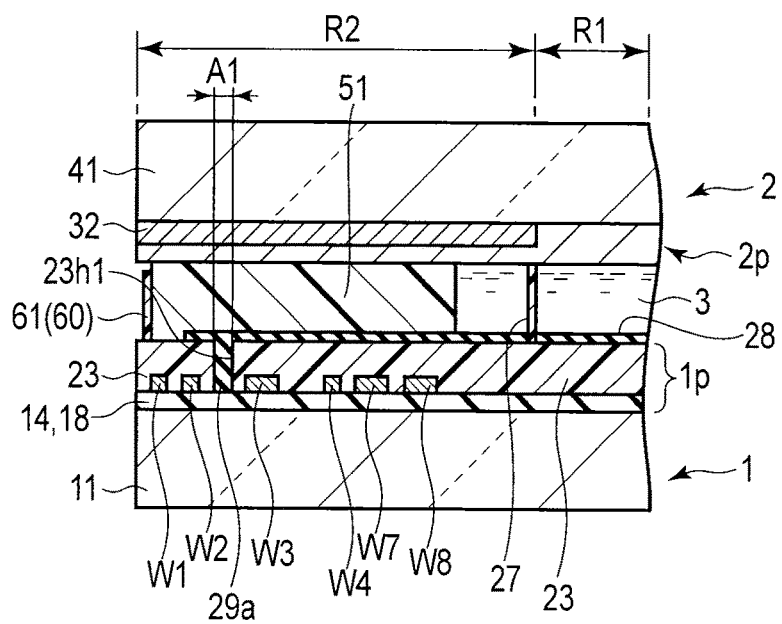
F I G. 17

DISPLAY PANEL

CROSS-REFERENCE TO RELATED APPLICATIONS

This application is based upon and claims the benefit of priority from Japanese Patent Application No. 2012-197759, filed Sep. 7, 2012, the entire contents of which are incorporated herein by reference.

FIELD

Embodiments described herein relate generally to a display panel.

BACKGROUND

As a display panel, for example, a liquid crystal display panel has been known. Liquid crystal display panels are used in the field of information devices typified by a computer, the field of video devices typified by a television receiver, and the like. In general, the liquid crystal display panel includes an array substrate, a counter substrate, and a liquid crystal layer sandwiched between these two substrates. The array substrate includes an organic insulating film and the like.

The array substrate and counter substrate have a display region. As a plurality of spacers, for example, a plurality of columnar spacers are interposed between the array substrate and the counter substrate to keep the gap between these two substrates constant. The array substrate and counter substrate are bonded by a rectangular frame-like sealing member disposed in a frame region outside the display region of these two substrates.

BRIEF DESCRIPTION OF THE DRAWINGS

FIG. 4 is a schematic plan view showing part of an array substrate shown in FIGS. 1, 2, and 3;

FIG. 5 is an enlarged plan view showing the array substrate and also showing the wiring structure of the array substrate;

FIG. 8 is a schematic plan view showing the liquid crystal display panel and also showing the structure of a slit;

FIG. 10 is a plan view showing a state in which a stopper and the like are formed on the mother glass and six array substrates are formed subsequently to FIG. 9;

FIG. 12 is a plan view showing a state in which a sealing member is applied to the mother glass subsequently to FIG. 10;

FIG. 14 is a sectional view taken along a line XIV-XIV in FIG. 13 and showing a state in which the two sheets of mother glass are bonded via the seal member;

FIG. 16 is an enlarged sectional view schematically showing the periphery of the liquid crystal display panel taken along a line XVI-XVI in FIG. 15;

FIG. 17 is an enlarged sectional view schematically showing the periphery of a liquid crystal display panel according to the third embodiment.

DETAILED DESCRIPTION

Figure 1:
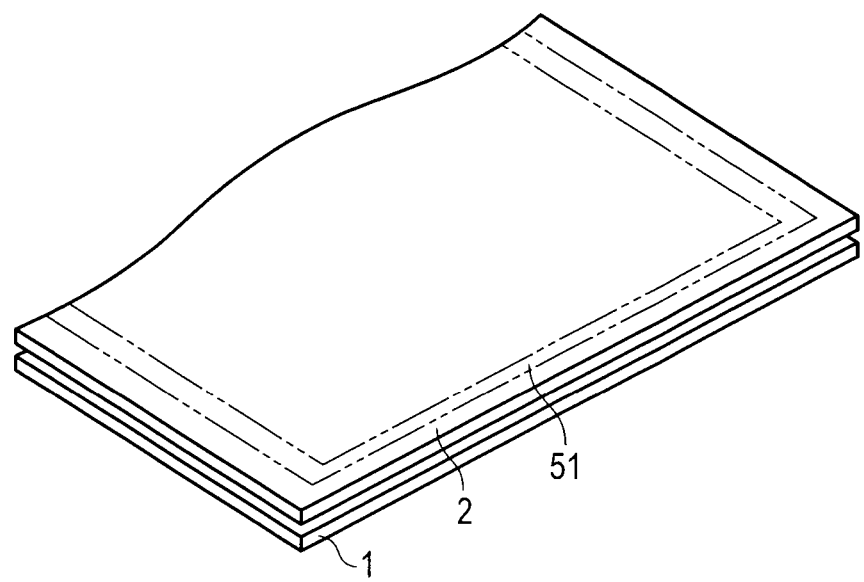
FIG. 1 is a perspective view showing a liquid crystal display panel according to the first embodiment.
Figure 2:
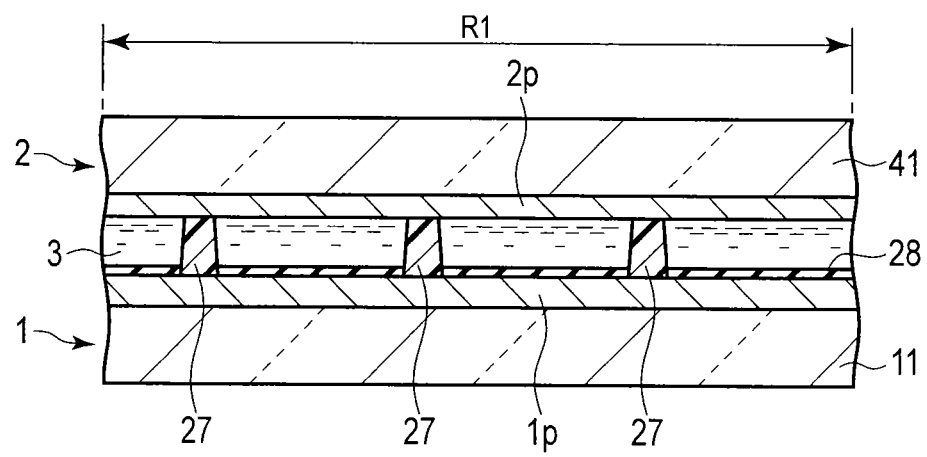
FIG. 2 is a schematic sectional view showing the liquid crystal display panel.

In general, according to one embodiment, there is provided a display panel comprising: an array substrate comprising an inorganic insulating film that is provided above a substrate and positioned in a display region and a frame region surrounding the display region, a first wiring line and a second wiring line that are formed at an interval on the inorganic insulating film and positioned in the frame region, an organic insulating film that is provided above the inorganic insulating film positioned in the display region and the frame region and covers the first wiring line and the second wiring line, a slit that is formed to extend through the organic insulating film between the first wiring line and the second wiring line, and a moisture-proof member that is filled in the slit and is in contact with the inorganic insulating film; and a counter substrate that is arranged to face the array substrate with a gap.

According to another embodiment, there is provided a display panel comprising: an array substrate comprising an inorganic insulating film that is provided above a substrate and positioned in a display region and a frame region surrounding the display region, outermost wiring line that is formed at an interval on the inorganic insulating film and positioned in the frame region, an organic insulating film that is provided above the inorganic insulating film positioned in the display region and the frame region and covers the outermost wiring line, a slit that is formed to extend through the organic insulating film, and a moisture-proof member that is filled in the slit and is in contact with the inorganic insulating film; and a counter substrate that is arranged to face the array substrate with a gap, wherein the outermost wiring line is positioned on a side of the display region with respect to the slit.

A liquid crystal display panel and a method of manufacturing the liquid crystal display panel according to the first embodiment will now be described in detail with reference to the accompanying drawings. First, the structure of the liquid crystal display panel will be explained. In this embodiment, the liquid crystal display panel is of the counter CF type in which a color filter is formed on the counter substrate side.

As shown in FIGS. 1, 2, 3, 4, 5, and 6, the liquid crystal display panel comprises an array substrate 1, a counter substrate 2 which is arranged to face the array substrate at a predetermined gap, a liquid crystal layer 3 held between these two substrates, and a color filter 4. Polarizers (not shown) are arranged on the outer surfaces of the array substrate 1 and counter substrate 2. A backlight unit (not shown) is arranged on the outer surface side of the array substrate 1. The array substrate 1 and counter substrate 2 have a rectangular display region R1. The color filter 4 is arranged in the display region R1 of the counter substrate 2.

The array substrate 1 includes a glass substrate 11 as a transparent insulating substrate. In the display region R1, a plurality of scanning lines 15 which run in the row direction X and are disposed side by side at an interval in the column direction Y perpendicular to the row direction X, and a plurality of signal lines 21 which run in the column direction Y perpendicular to the scanning lines 15 and are disposed side by side at an interval in the row direction X are arranged in cross stripes on the glass substrate 11.

On the glass substrate 11, a plurality of auxiliary capacitance lines 17 are formed, which constitute auxiliary capacitance elements 24, run in the row direction X to cross the signal lines 21, and are disposed side by side at an interval in the column direction Y. The auxiliary capacitance lines 17 run parallel to the scanning lines 15.

The array substrate 1 and counter substrate 2 include a plurality of pixels 20 which are arranged in a matrix to overlap regions surrounded by the signal lines 21 and auxiliary capacitance lines 17. That is, each pixel 20 is arranged to overlap a region surrounded by two adjacent signal lines 21 and two adjacent auxiliary capacitance lines 17. Each pixel 20 on the array substrate 1 includes a TFT (Thin-Film Transistor) 19 as a switching element. More specifically, the TFT 19 is arranged near the intersection of the scanning line 15 and signal line 21.

The TFT 19 includes a semiconductor layer 12 made of amorphous silicon (a-Si) or polysilicon (p-Si) as a semiconductor, and a gate electrode 16 obtained by extending part of the scanning line 15. In this embodiment, the semiconductor layer 12 and an auxiliary capacitance electrode 13 (to be described later) are made of p-Si.

More specifically, in the display region R1, the semiconductor layer 12 and auxiliary capacitance electrode 13 are provided on the glass substrate 11. A gate insulating film 14 is deposited on the glass substrate including the semiconductor layer and auxiliary capacitance electrode. On the gate insulating film 14, the scanning line 15, gate electrode 16, and auxiliary capacitance line 17 are formed. The auxiliary capacitance line 17 and auxiliary capacitance electrode 13 are arranged to face each other via the gate insulating film 14. An interlayer dielectric film 18 is deposited on the gate insulating film 14, scanning line 15, gate electrode 16, and auxiliary capacitance line 17. In this embodiment, the interlayer dielectric film 18 is an inorganic insulating film.

The signal line 21 and a contact electrode 22 are provided on the interlayer dielectric film 18. Each contact electrode 22 is connected to the drain region of the semiconductor layer 12 through a contact hole formed in the gate insulating film 14 and interlayer dielectric film 18, and to a pixel electrode 26 (to be described later). Further, the contact electrode 22 is connected to the auxiliary capacitance electrode 13 through another contact hole formed in the gate insulating film 14 and interlayer dielectric film 18. The auxiliary capacitance line 17 is formed except for the connecting portion of the auxiliary capacitance electrode 13 and contact electrode 22.

The signal line 21 is connected to the source region of the semiconductor layer 12 through a contact hole formed in the gate insulating film 14 and interlayer dielectric film 18. A protective insulating film 23 is formed over the interlayer dielectric film 18, signal line 21, and contact electrode 22. The protective insulating film 23 also functions as a planarizing film which planarizes unevenness generated by wiring lines and the like on the substrate. In this embodiment, the protective insulating film 23 is an organic insulating film. The protective insulating film 23 covers not only the display region R1 but also a frame region R2 surrounding the display region R1.

The pixel electrodes 26 are formed from a transparent conductive film of ITO (Indium Tin Oxide) or the like on the protective insulating film 23. A plurality of contact holes 25 are formed in the protective insulating film 23 above the auxiliary capacitance lines 17. The contact holes 25 are formed in the respective pixels 20.

Each pixel electrode 26 is connected to the contact electrode 22 through the contact hole 25. The periphery of the pixel electrode 26 opposes the auxiliary capacitance line 17 and signal line 21. The pixel electrode 26 forms the pixel 20.

In the above-mentioned manner, an array pattern 1*p* is provided on the glass substrate 11. In the display region R1, the array pattern 1*p* is interposed between the glass substrate 11 and the pixel electrodes 26. On the array pattern 1*p*, a plurality of columnar spacers 27 are formed as a plurality of spacers. An alignment film 28 is provided on the array pattern 1*p* (pixel electrodes 26 and the like) on which the columnar spacers 27 are formed.

Figure 3:
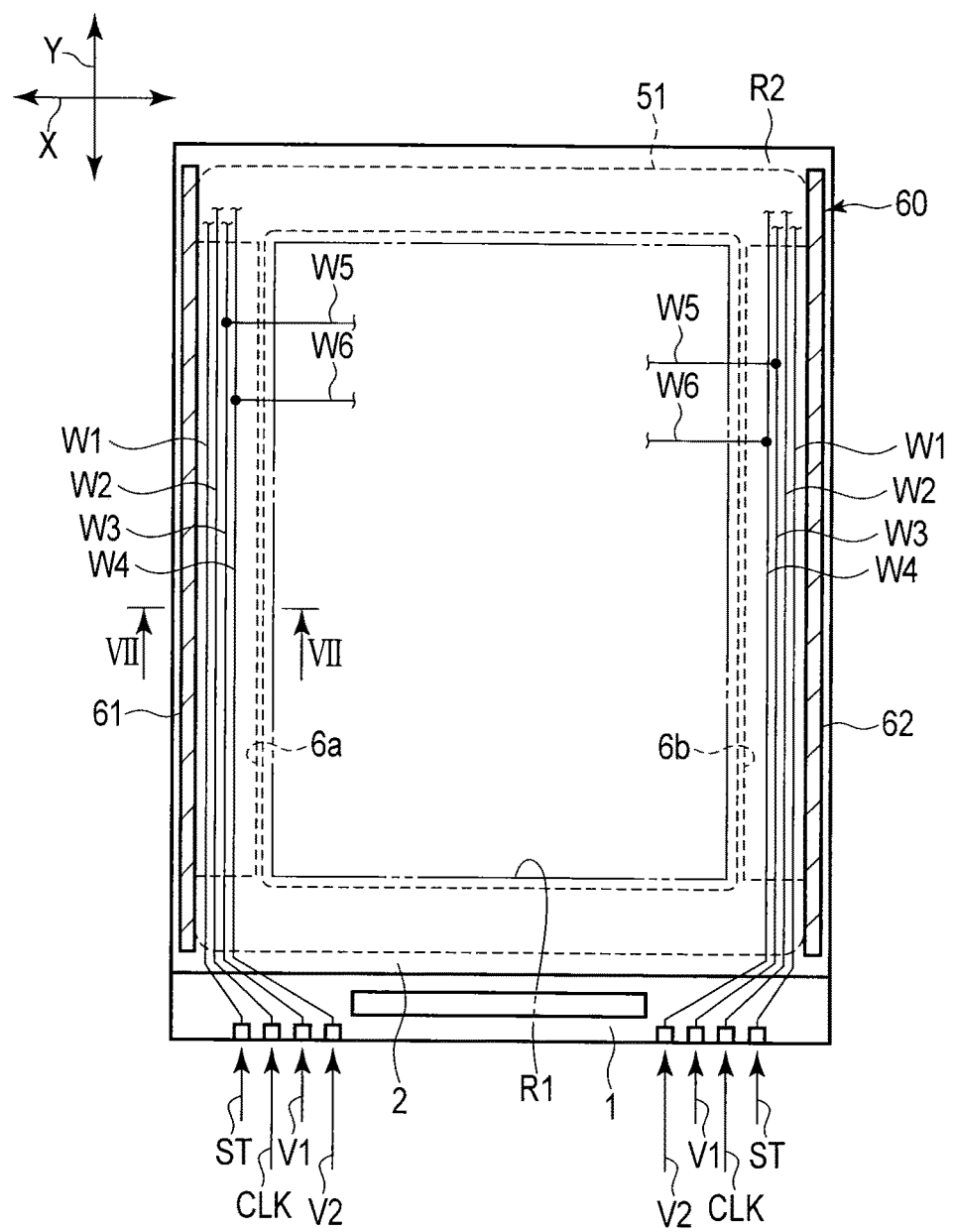
FIG. 3 is a schematic plan view showing the liquid crystal display panel and also showing the structure of wiring lines.
Figure 6:
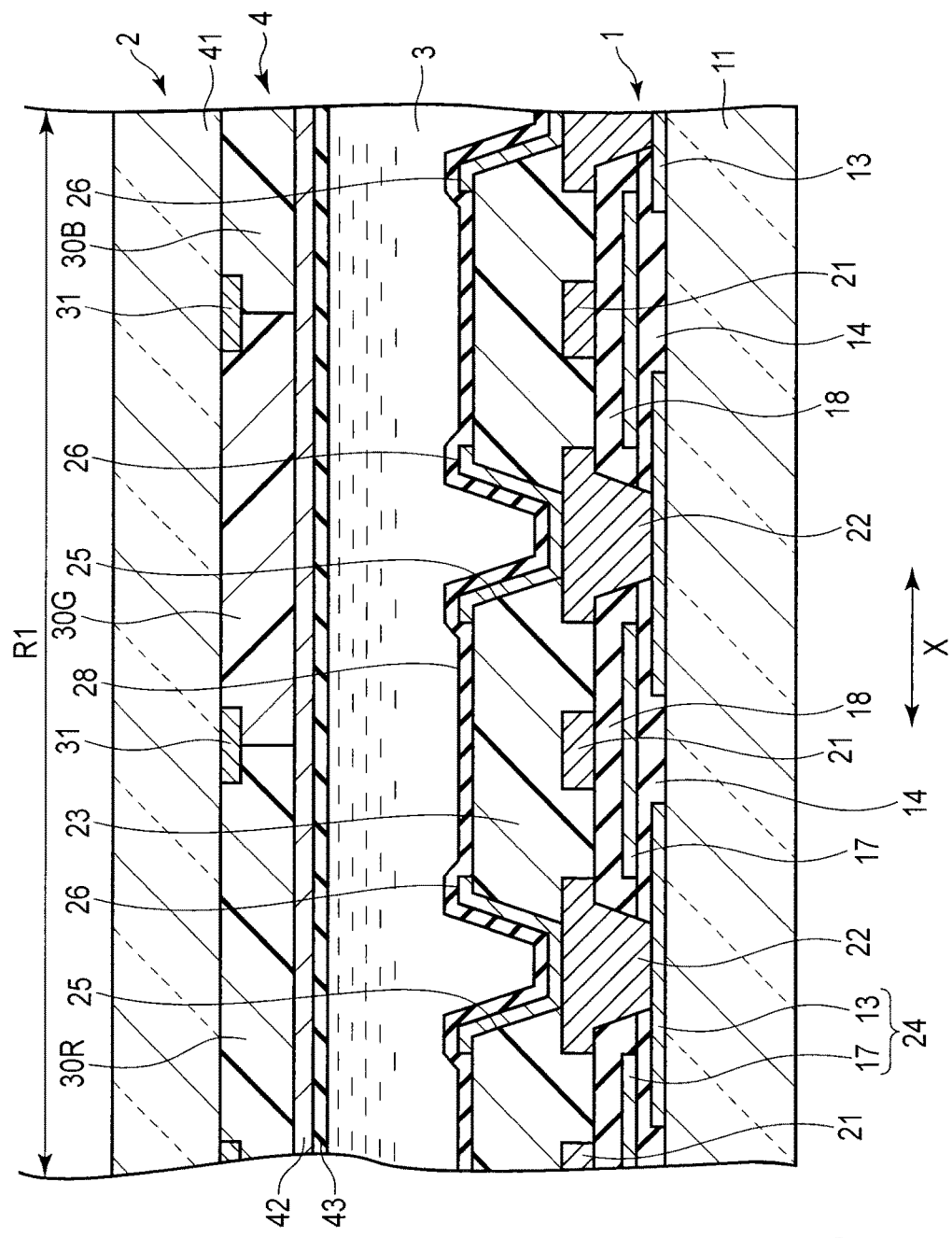
FIG. 6 is an enlarged sectional view showing the liquid crystal display panel and also showing the structure of the liquid crystal display panel.
Figure 7:
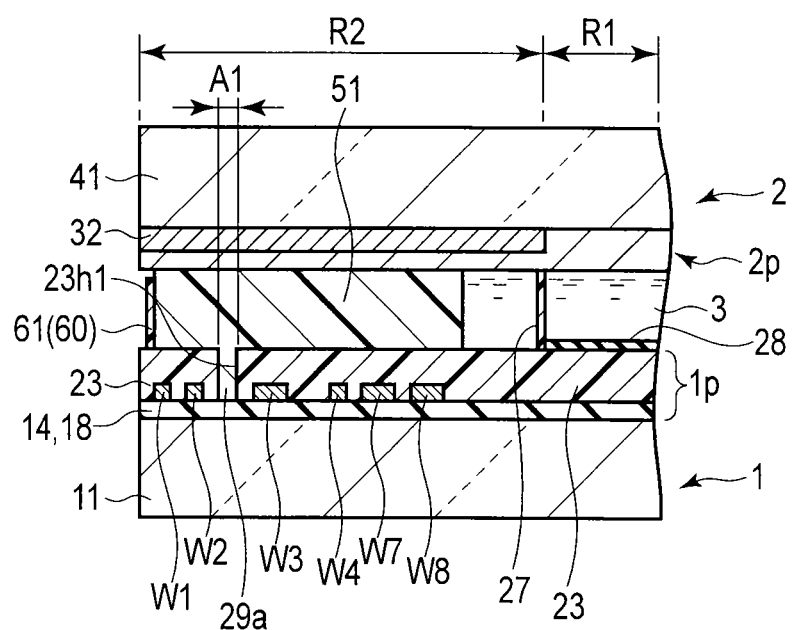
FIG. 7 is an enlarged sectional view schematically showing the periphery of the liquid crystal display panel taken along a line VII-VII in FIG. 3.
Figure 9:
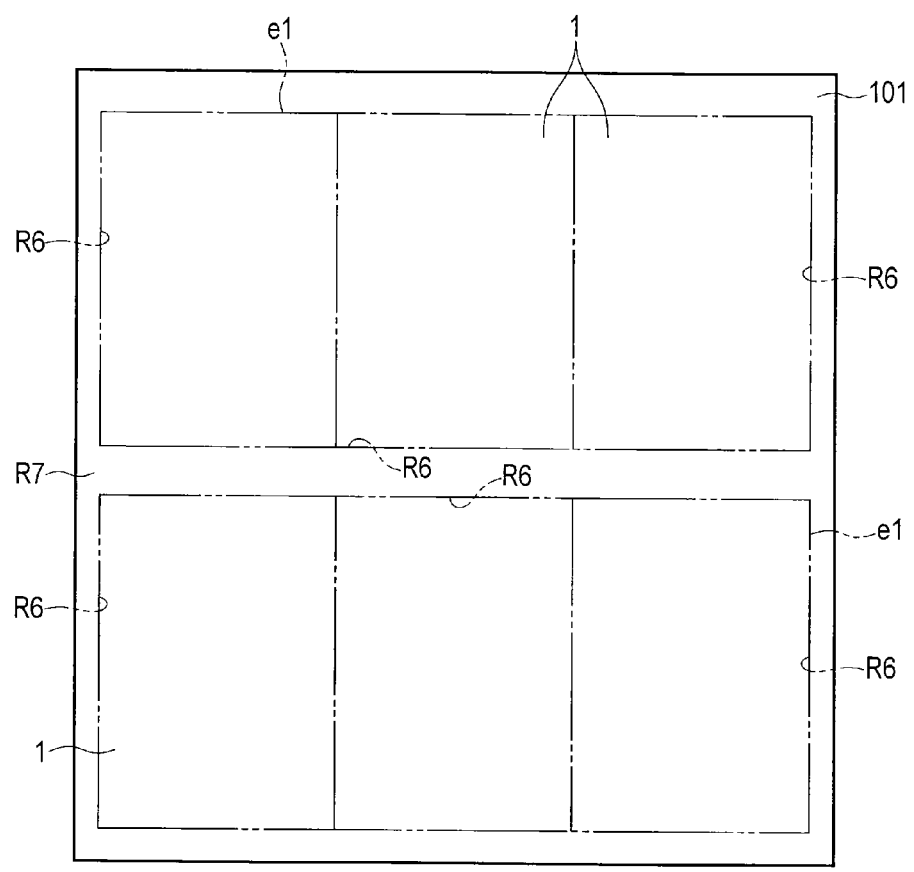
FIG. 9 is a plan view showing a state in which an array pattern is provided on a mother glass in a step of manufacturing the liquid crystal display panel.
Figure 11:
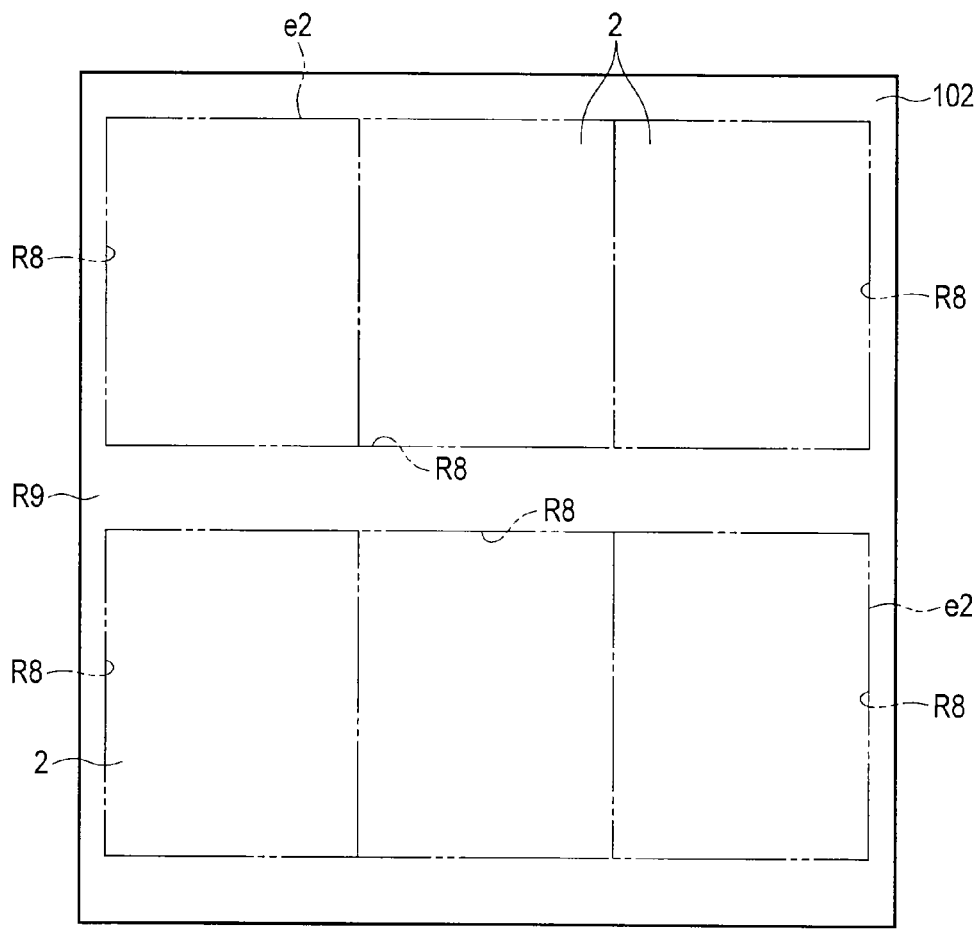
FIG. 11 is a plan view showing a state in which six counter substrates are provided on a mother glass in a step of manufacturing the liquid crystal display panel.
Figure 13:
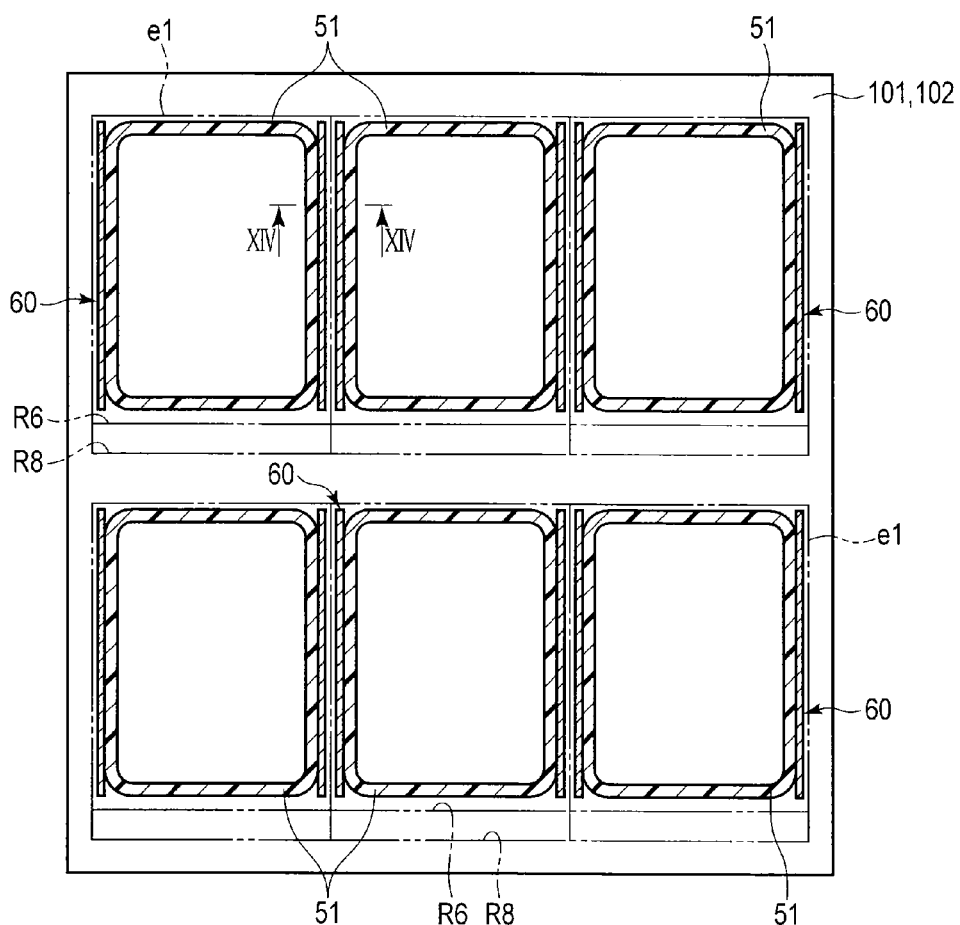
FIG. 13 is a plan view showing a state in which the two sheets of mother glass shown in FIGS. 11 and 12 are bonded via the sealing member.

As shown in FIGS. 3 and 7, the array pattern 1*p* and a stopper 60 are provided on the glass substrate 11 in the frame region R2. In the frame region R2, the array pattern 1*p* includes driving circuits 6*a* and 6*b*, the gate insulating film 14, the interlayer dielectric film 18, wiring lines W1, W2, W3, W4, W7, and W8, and the protective insulating film 23.

The driving circuits 6*a* and 6*b* are arranged to face each other in the row direction X via the display region R1. The driving circuits 6*a* and 6*b* are simultaneously formed from the same material when forming the TFT 19 and the like. The driving circuits 6*a* and 6*b* are Y drivers connected to the scanning line 15 and auxiliary capacitance line 17.

The wiring lines W1, W2, W3, W4, W7, and W8 are arranged on each of the left and right sides of the frame region R2 and form the driving circuits 6*a* and 6*b*. The wiring lines W1, W2, W3, W4, W7, and W8 run in the column direction Y and are disposed at an interval in the row direction X. The wiring lines W1, W2, W3, W4, W7, and W8 are provided on the interlayer dielectric film 18 and covered with the protective insulating film 23. The wiring lines W1, W2, W3, and W4 extend to the end of the glass substrate 11 and are connected to outer lead bonding pads.

The wiring lines W1 and W2 are control signal wiring lines as the first wiring lines, and the wiring lines W3 and W4 are power supply wiring lines as the second wiring lines. The wiring line W1 receives a start pulse signal ST via the pad. The wiring line W2 receives a clock signal CLK via the pad. The wiring line W3 receives a voltage V1 (VDD) from a high-potential power supply (not shown) via the pad. The wiring line W4 receives a voltage V2 (VSS) from a low-potential power supply (not shown) via the pad. The wiring lines W3 and W4 are power supply wiring lines different in potential. For example, the voltage V1 is +10 V, and the voltage V2 is −5 V.

The wiring lines W5 and W6 are connection wiring lines and run in a direction perpendicular to a slit 23*h*1 (to be described later). In this embodiment, the wiring lines W5 and W6 run in the row direction X. The wiring lines W5 and W6 are provided on at least the gate insulating film 14 in the frame region R2. The wiring lines W5 and W6 are covered with the interlayer dielectric film 18. In this embodiment, the wiring lines W5 and W6 are formed to run to the display region R1. In the frame region R2, the interlayer dielectric film 18 includes a through hole facing the wiring line W5, and a through hole facing the wiring line W6. The wiring line W3 is electrically connected to the wiring line W5 through the through hole, and the wiring line W4 is electrically connected to the wiring line W6 through the through hole.

As shown in FIGS. 3, 7, and 8, the protective insulating film 23 includes the slit 23h1. The slit 23h1 is formed to extend through the protective insulating film 23. The slit 23h1 is formed to expose the interlayer dielectric film 18 without exposing the wiring lines. The slit 23h1 is formed into a frame shape. Here, the slit 23h1 is formed continuously into a rectangular frame. On the left or right side of the frame region R2, the slit 23h1 extends in a direction in which the wiring lines W2 and W3 run. The slit 23h1 has a width A1 of 5 to 10 μm.

Note that the wiring lines W1 and W2 are positioned at the outer edge side of the array substrate 1 with respect to the slit 23h1. The wiring lines W3, W4, W7, and W8 are positioned on the side of the display region R1 with respect to the slit 23h1. The slit 23h1 is positioned at the top of the array pattern 1p. A moisture-proof member 29a is filled in the slit and is in contact with the interlayer dielectric film 18.

As shown in FIGS. 3 and 7, the stopper 60 includes wall-like projections which are arranged at corresponding portions of a resin film positioned at an interval at the periphery of the display region R1 on at least one of the array substrate 1 and counter substrate 2, and are formed to have a gap from at least one of the array substrate 1 and counter substrate 2.

In this embodiment, the stopper 60 includes wall-like projections 61 and 62 which are arranged on the array substrate 1 at an interval at the periphery of the display region R1 and formed to have a gap from the counter substrate 2.

The projections 61 and 62 are provided on the protective insulating film 23. The projections 61 and 62 extend in the column direction Y. The projection 61 is positioned on an opposite side of the driving circuit 6a with respect to the display region R1 at an interval at the peripheries of the array substrate 1 and counter substrate 2. The projection 62 is positioned on an opposite side of the driving circuit 6b with respect to the display region R1 at an interval at the peripheries of the array substrate 1 and counter substrate 2.

The projections 61 and 62 suppress the spread of a sealing member 51 (to be described later) toward the peripheries of the array substrate 1 and counter substrate 2. The projections 61 and 62 are simultaneously formed from the same material as that of the columnar spacer 27 on the array substrate 1. The projections 61 and 62 are formed to be shorter than the columnar spacer 27. However, the projections 61 and 62 may be as tall as the columnar spacer 27.

As shown in FIGS. 1, 2, 3, 6, and 7, the counter substrate 2 includes a glass substrate 41 as a transparent insulating substrate. A color filter 4 is formed on the glass substrate 41. The color filter 4 includes light shielding portions 31, a peripheral light shielding portion 32, and a plurality of colored layers. The colored layers include, for example, the red colored layer 30R, green colored layer 30G, and blue colored layer 30B.

The light shielding portions 31 are formed in cross stripes. The light shielding portions 31 are formed to face the auxiliary capacitance lines 17 and signal lines 21. The peripheral light shielding portion 32 is formed into a rectangular frame in the entire frame region R2. The peripheral light shielding portion 32 contributes to shielding of light (backlight) leaking from the outside of the display region R1.

The colored layers 30R, 30G, and 30B are provided on the glass substrate 41 and light shielding portions 31. The colored layers 30R, 30G, and 30B extend like a band in the column direction Y. The colored layers 30R, 30G, and 30B are adjacent to each other in the row direction X and alternately arranged side by side. The peripheries of the colored layers 30R, 30G, and 30B overlap the light shielding portions 31.

Note that an overcoat layer (not shown) may be arranged on the color filter 4. This can relax the influence of unevenness of the surfaces of the light shielding portions 31 and color filter 4.

A counter electrode 42 is formed from a transparent conductive film of ITO or the like on the color filter 4 (overcoat layer). An alignment film 43 is provided on the counter electrode 42. In the above-mentioned manner, a counter pattern 2p is provided on the glass substrate 41. The counter pattern 2p includes the color filter 4, counter electrode 42, and alignment film 43. The counter pattern 2p may further include the overcoat layer.

The array substrate 1 and counter substrate 2 are arranged to face each other with a predetermined gap by the columnar spacers 27. The sealing member 51 faces the frame region R2, is interposed between the array substrate 1 and the counter substrate 2, positioned between the periphery of the display region R1 and the projections 61 and 62, and formed continuously into a rectangular frame. The sealing member 51 is positioned at an interval around the entire periphery of each of the array substrate 1 and counter substrate 2.

The array substrate 1 and counter substrate 2 are bonded to each other by the sealing member 51. The sealing member 51 is formed on the moisture-proof member 29a. In this embodiment, the moisture-proof member 29a is formed from part of the sealing member 51 that is filled in the slit 23h1 and is in contact with the interlayer dielectric film 18. The sealing member 51 has a property of blocking moisture. The sealing member 51 can be formed using a resin such as acrylic. This can block the entrance of moisture into the wiring lines W3, W4, W7, and W8 via the protective insulating film 23 and the surface (interface) of the protective insulating film 23.

The sealing member 51 entirely covers each of the driving circuits 6a and 6b. The projections 61 and 62 (stopper 60) suppress the spread of the sealing member 51 toward the peripheries of the array substrate 1 and counter substrate 2 (spread in the row direction X). Note that the projections 61 and 62 contact the side surfaces of the sealing member 51. Since the projections 61 and 62 aim at suppressing the spread of the sealing member 51, they do not always contact the sealing member 51 at all portions and may have shapes such that they are in partial contact with the sealing member 51.

The liquid crystal layer 3 is formed in a space surrounded by the array substrate 1, counter substrate 2, and sealing member 51.

In the above-described way, the liquid crystal display panel is formed.

A more detailed arrangement of the liquid crystal display panel will be explained together with its manufacturing method.

As shown in FIGS. 1, 2, 3, 4, 5, 6, 7, 8, and 9, first, a mother glass 101 as the first mother substrate larger in dimensions than the array substrate 1 is prepared as a transparent insulating substrate. According to this embodiment, the mother glass 101 has six rectangular array substrate formation regions R6 each for forming the array substrate 1, and a non-effective region R7 outside the array substrate formation regions R6. The mother glass 101 has first projected cutting lines e1 along the peripheries of the array substrate formation regions R6.

On the prepared mother glass 101, an array pattern 1*p* including TFTs 19, auxiliary capacitance elements 24, driving circuits 6*a* and 6*b*, and a protective insulating film 23 including slits 23*h*1 is formed by normal manufacturing steps, for example, by repeating deposition and patterning.

Then, for example, a photosensitive acrylic transparent resin is applied to the entire surface on the mother glass 101 by using a spinner. The transparent resin is then dried. The transparent resin is exposed and patterned using a predetermined photomask. The exposed transparent resin is developed, baked, and cured.

Accordingly, columnar spacers 27 and projections 61 and 62 are formed simultaneously, as shown in FIGS. 1, 2, 3, 4, 5, 6, 7, 8, and 10. Since the projections 61 and 62 and the columnar spacers 27 can be formed simultaneously, they can be formed without increasing the number of manufacturing steps.

An alignment film material is applied to the entire surface on the mother glass 101 including the display region R1 and is patterned, forming an alignment film 28. If necessary, the alignment film 28 undergoes predetermined alignment film treatment processing (rubbing).

As a result, six array substrates 1 are completed from one mother glass 101.

As shown in FIGS. 1, 2, 3, 6, 7, 8, and 11, in a method of manufacturing a counter substrate 2, first, a mother glass 102 as the second mother substrate larger in dimensions than the counter substrate 2 is prepared as a transparent insulating substrate. According to this embodiment, the mother glass 102 has six rectangular counter substrate formation regions R8 each for forming the counter substrate 2, and a non-effective region R9 outside the counter substrate formation regions R8. The mother glass 102 has second projected cutting lines e2 along the peripheries of the counter substrate formation regions R8.

On the prepared mother glass 102, a counter pattern 2*p* is formed by normal manufacturing steps. If necessary, an alignment film 43 undergoes predetermined alignment film treatment processing (rubbing).

As a result, six counter substrates 2 are completed from one mother glass 102.

As shown in FIGS. 7, 8, and 12, for example, an ultraviolet curable resin is applied to the entire frame region R2 of each array substrate 1 by printing as a material for forming the sealing member 51. Frame-like sealing members 51 are therefore formed. When forming the sealing member 51, an electrode transfer member for applying a voltage from the array substrate 1 to the counter substrate 2 can be formed on an electrode transfer electrode (not shown) around the sealing member 51.

As shown in FIGS. 11, 12, 13, and 14, a liquid crystal material is dropped to a region surrounded by each sealing member 51. The mother glasses 101 and 102 are arranged to face each other so that the alignment films 28 and 43 face each other. The array substrate 1 and counter substrate 2 are arranged to face each other while keeping a predetermined gap by a plurality of columnar spacers 27. The peripheries of the array substrate 1 and counter substrate 2 are bonded by the sealing member 51. At this time, the sealing member 51 is filled in the slit 23*h*1. The projections 61 and 62 suppress the spread of the sealing member 51.

The sealing member 51 is externally irradiated with ultraviolet rays to cure it, and is further thermally cured to completely cure it. Thus, the mother glasses 101 and 102 are joined via the sealing member 51.

Then, the mother glass 101 is divided along the first projected cutting lines e1, and the mother glass 102 is divided along the second projected cutting lines e2. At the time of division, for example, scribe lines are drawn along the first projected cutting lines e1 and second projected cutting lines e2. The array substrates 1 are cut out from the mother glass 101, and the counter substrates 2 are cut out from the mother glass 102.

As shown in FIG. 3, six liquid crystal display panels are extracted from the cut sheets of mother glass 101 and 102. Thus, the six liquid crystal display panels are completed.

According to the liquid crystal display panel and method of manufacturing the liquid crystal display panel according to the first embodiment configured as described above, the liquid crystal display panel comprises the array substrate 1, counter substrate 2, liquid crystal layer 3, and sealing member 51. The array substrate 1 includes the wiring lines W1 to W8, the interlayer dielectric film 18, the protective insulating film 23, and the moisture-proof member 29*a*. The protective insulating film 23 is formed in the display region R1 and frame region R2 and covers the wiring lines W1 to W4, W7, and W8. The protective insulating film 23 includes the slit 23*h*1 which is formed to extend through the protective insulating film 23 between the wiring lines W2 and W3. The moisture-proof member 29*a* is formed from part of the sealing member 51 that is filled in the slit 23*h*1 and is in contact with the interlayer dielectric film 18.

The sealing member 51 has a property of blocking moisture. The slit 23*h*1 and moisture-proof member 29*a* block the entrance, toward the display region R1, of moisture running along the protective insulating film 23, which is an organic insulating film, and the interface between the protective insulating film 23 and the interlayer dielectric film 18. Note that the interlayer dielectric film (inorganic insulating film) 18 has a property of blocking moisture. In this embodiment, the interlayer dielectric film 18 can block the entrance of moisture toward the wiring lines W3, W4, W7, and W8 and the like. Particularly when the slit 23*h*1 and moisture-proof member 29*a* are arranged between wiring lines each having a large potential difference from an adjacent wiring line, they can prevent corrosion of the wiring lines arising from moisture and the potential difference. In this embodiment, the entrance of moisture to the wiring lines W3 and W4 which readily corrode can be blocked. This can eliminate the fear of corrosion of the wiring lines W3, W4, W7, and W8 and the like.

In this embodiment, the slit 23*h*1 is formed into a frame shape and entirely filled with the sealing member 51. Hence, the entrance of moisture into the liquid crystal display panel can be further blocked, and adverse effects of moisture such as corrosion of the wiring lines can be further prevented.

The slit 23*h*1 has the width A1 of 5 to 10 μm. The slit 23*h*1 can be formed in a blank space (space not used by the wiring lines and the like). If patterning of the protective insulating film 23 is possible, the width A1 of the slit 23*h*1 may be smaller than 5 μm. Even in this case, the moisture-proof effect can be obtained. When the space not used by the wiring lines and the like has room, the width A1 of the slit 23*h*1 may be 10 μm or more. The slit 23*h*1 may be formed along a wiring line between wiring lines. For example, between a wiring line having a common potential and a power supply wiring line for supplying a high-level potential, the slit 23h1 may be formed parallel to one of the wiring lines.

The slit 23h1 can be formed between the wiring lines W2 and W3. The protective insulating film 23 on the outer edge side of the array substrate 1 with respect to the wiring lines W1 to W4, W7, and W8 is removed all around by a width of 200 to 300 μm, and no sealing member need be formed in the removed space, thereby narrowing the frame.

Since the width A1 of the slit 23h1 is small, the slit 23h1 can be formed without exposing the wiring lines W1 to W4, W7, and W8. Since the entrance of static electricity to the wiring lines W1 to W4, W7, and W8 can be prevented, destruction of the peripheral circuits (driving circuits 6a and 6b) of the wiring lines can be prevented. A decrease in ESD (Electro Static Discharge) breakdown voltage can therefore be prevented.

When forming the contact hole 25, the slit 23h1 can be formed at the same time without increasing the number of manufacturing steps.

The projections 61 and 62 are arranged on the array substrate 1 at an interval at the periphery of the display region R1, and formed to have a gap from the counter substrate 2. The sealing member 51 is positioned between the periphery of the display region R1 and the projection 61 and between the periphery of the display region R1 and the projection 62. The projections 61 and 62 suppress the spread of the sealing member 51 toward the peripheries of the array substrate 1 and counter substrate 2.

The sealing member 51 can be applied to a region near the periphery of the array substrate 1 (counter substrate 2). Even in a liquid crystal display panel having a small frame width, the spread of the sealing member 51 into the display region R1 can be suppressed, preventing a display error. The projections 61 and 62 suppress the spread of the sealing member 51 toward the peripheries of the array substrate 1 and counter substrate 2, and the sealing member 51 does not spread to overlap the first projected cutting lines e1 (second projected cutting lines e2). Thus, the array substrate 1 and counter substrate 2 can be satisfactorily cut out from the mother glasses 101 and 102.

When cutting out the liquid crystal display panel from the mother glasses 101 and 102, a cutting edge for cutting the glass contacts portions between the projections 61 and 62, that is, the projected cutting lines e1 and e2. When the cutting edge contacts the glass surface, the wall-like projections 61 and 62 support the glass, and the pressure of the cutting edge on the glass surface is uniformly distributed on the glass surface. Hence, the glass can be cut without problems such as chipping and breaking of the glass.

In this embodiment, the projections 61 and 62 are arranged on the two, left and right sides at the periphery of the display region R1 of the liquid crystal display panel. That is, the projections 61 and 62 are arranged along end sides perpendicular to an end side on which outer lead bonding pads are arranged. Similarly, the slit 23h1 and moisture-proof member 29a are arranged along the end sides perpendicular to the end side on which the pads are arranged. The projections may be arranged on the upper side and/or lower side of periphery section of the display region R1, that is, the end side on which the pads are arranged and an end side facing this end side.

By arranging the stopper 60 in this way, the glass can be cut satisfactorily without problems such as chipping of the glass.

Accordingly, the liquid crystal display panel and the method of manufacturing the liquid crystal display panel capable of narrowing the frame with a high product yield can be obtained.

Next, a liquid crystal display panel according to the second embodiment will be described. The liquid crystal display panel according to the second embodiment can be formed using the same method as the method of manufacturing the liquid crystal display panel according to the first embodiment. In the second embodiment, the same reference numerals as those in the first embodiment denote the same functional parts, and a detailed description thereof will not be repeated.

Figure 15:
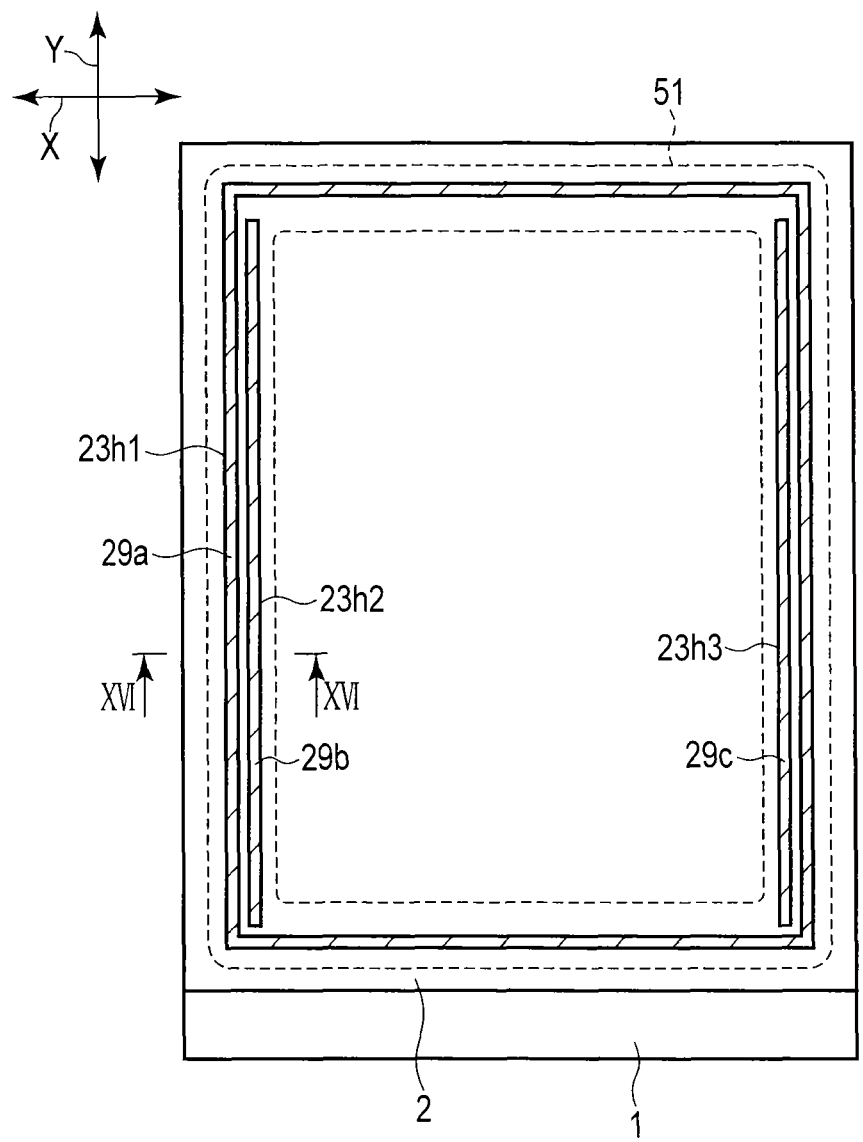
FIG. 15 is a schematic plan view showing a liquid crystal display panel according to the second embodiment and also showing the structure of a slit.

As shown in FIGS. 3, 15, and 16, a protective insulating film 23 includes slits 23h2 and 23h3 in addition to a slit 23h1. Similar to the slit 23h1, the slits 23h2 and 23h3 are formed to extend through the protective insulating film 23. The slits 23h2 and 23h3 are formed to expose an interlayer dielectric film 18 without exposing wiring lines. The slits 23h2 and 23h3 are formed into a band shape to extend like a frame in the column direction Y. The slits 23h2 and 23h3 extend in a direction in which wiring lines W3 and W4 run. The slit 23h2 has a width A2 of, e.g., 5 to 10 μm. The slit 23h3 also has a width of, e.g., 5 to 10 μm.

On the left side of a frame region R2, the slit 23h2 is formed between the wiring lines W3 and W4. On the right side of the frame region R2, the slit 23h3 is formed between the wiring lines W3 and W4. The slits 23h1, 23h2, and 23h3 are positioned at the top of an array pattern 1p. A moisture-proof member 29a is filled in the slit 23h1 and is in contact with the interlayer dielectric film 18. A moisture-proof member 29b is filled in the slit 23h2 and is in contact with the interlayer dielectric film 18. A moisture-proof member 29c is filled in the slit 23h3 and is in contact with the interlayer dielectric film 18. A sealing member 51 is provided on the moisture-proof members 29a, 29b, and 29c. In this embodiment, the moisture-proof members 29a, 29b, and 29c are formed by filling part of the sealing member 51 in the slits 23h1, 23h2, and 23h3.

According to the liquid crystal display panel and method of manufacturing the liquid crystal display panel according to the second embodiment configured as described above, the liquid crystal display panel comprises an array substrate 1, a counter substrate 2, a liquid crystal layer 3, and the sealing member 51. The protective insulating film 23 includes the slits 23h2 and 23h3 which are formed to extend through the protective insulating film 23 between the wiring lines W3 and W4. That is, the slits are formed double. Part of the sealing member 51 is filled in the slits 23h2 and 23h3, is in contact with the interlayer dielectric film 18, and forms the moisture-proof members 29b and 29c.

In this embodiment, the moisture-proof member 29a (sealing member 51) formed in the slit 23h1 can block the entrance of moisture to the wiring lines W3, W4, W7, and W8 and the like. The moisture-proof members 29b and 29c (sealing member 51) formed in the slits 23h2 and 23h3 can further block the entrance of moisture to the wiring lines W4, W7, and W8 and the like. This can eliminate the fear of corrosion of the wiring lines W3, W4, W7, and W8 and the like. Since the entrance of moisture to the wiring line W4 can be further blocked, corrosion of the wiring lines W3 and W4 each having a large potential difference between adjacent wiring lines can be further reduced.

The slits 23h2 and 23h3 can be formed between the wiring lines W3 and W4. Similar to the slit 23h1, the slits 23h2 and 23h3 can be formed in a blank space (space not used by the wiring lines and the like), and the frame can be narrowed. In addition, the same effects as those in the first embodiment can be obtained.

As a result, the liquid crystal display panel and method of manufacturing the liquid crystal display panel capable of narrowing the frame with a high product yield can be obtained.

Next, a liquid crystal display panel according to the third embodiment will be described. The liquid crystal display panel according to the third embodiment can be formed using the same method as the method of manufacturing the liquid crystal display panel according to the first embodiment. In the third embodiment, the same reference numerals as those in the first embodiment denote the same functional parts, and a detailed description thereof will not be repeated.

As shown in FIG. 17, an alignment film 28 is made of an inorganic material lower in moisture permeability than a protective insulating film 23. The alignment film 28 has a property of blocking moisture. A moisture-proof member 29a is made of the same material as that of the alignment film 28. The alignment film 28 is formed to extend to a position where it faces a slit 23h1 in a frame region R2. Preferably, the alignment film 28 is formed to extend to a position exceeding the slit 23h1 in the frame region R2. The moisture-proof member 29a is formed from part of the alignment film 28 which is filled in the slit 23h1 and is in contact with the interlayer dielectric film 18. As described above, in this embodiment, the alignment film 28 in the display region R1 and the moisture-proof member 29a are integrally formed. However, the moisture-proof member 29a may be formed to be separated from the alignment film 28 in the display region R1.

According to the liquid crystal display panel and method of manufacturing the liquid crystal display panel according to the third embodiment configured as described above, the liquid crystal display panel comprises an array substrate 1, a counter substrate 2, a liquid crystal layer 3, and a sealing member 51. The protective insulating film 23 includes the slit 23h1 which is formed to extend through the protective insulating film 23 between wiring lines W2 and W3. When the alignment film 28 has a property of blocking moisture, the moisture-proof member 29a may be formed by filling part of the alignment film 28 in the slit 23h1.

In this embodiment, the moisture-proof member 29a formed in the slit 23h1 can block the entrance of moisture to the wiring lines W3, W4, W7, and W8 and the like. This can eliminate the fear of corrosion of the wiring lines W3, W4, W7, and W8 and the like. Since the entrance of moisture to the wiring line W4 can be further blocked, corrosion of the wiring lines W3 and W4 each having a large potential difference between adjacent wiring lines can be further reduced.

Note that the above-described effects can be obtained if the material forming the alignment film 28 can be filled in the slit 23h1. If the width A1 of the slit 23h1 is 5 to 10 μm, the material forming the alignment film 28 can be filled in the slit 23h1. The width A1 of the slit 23h1 may exceed 10 μm as long as the material forming the alignment film 28 can be filled in the slit 23h1.

In addition, the same effects as those of the first embodiment can be obtained.

Hence, the liquid crystal display panel and method of manufacturing the liquid crystal display panel capable of narrowing the frame with a high product yield can be obtained.

Next, a liquid crystal display panel according to the fourth embodiment will be described. The liquid crystal display panel according to the fourth embodiment can be formed using the same method as the method of manufacturing the liquid crystal display panel according to the first embodiment. In the fourth embodiment, the same reference numerals as those in the first embodiment denote the same functional parts, and a detailed description thereof will not be repeated.

Figure 18:
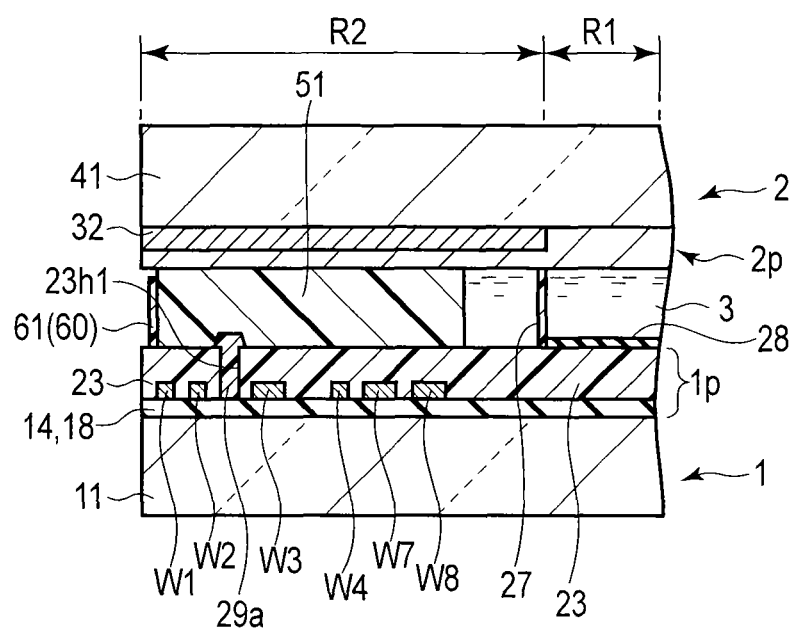
FIG. 18 is an enlarged sectional view schematically showing the periphery of a liquid crystal display panel according to the fourth embodiment.

As shown in FIG. 18, a columnar spacer 27 is made of a material lower in moisture permeability than a protective insulating film 23. The material forming the columnar spacer 27 has a property of blocking moisture. A moisture-proof member 29a is made of the same material as that of the columnar spacer 27. The material forming the columnar spacer 27 is filled in a slit 23h1, is in contact with an interlayer dielectric film 18, and forms the moisture-proof member 29a. The columnar spacer 27, projections 61 and 62, and the moisture-proof member 29a are simultaneously made of the same material.

According to the liquid crystal display panel and method of manufacturing the liquid crystal display panel according to the fourth embodiment configured as described above, the liquid crystal display panel comprises an array substrate 1, a counter substrate 2, a liquid crystal layer 3, and a sealing member 51. The protective insulating film 23 includes the slit 23h1 which is formed to extend through the protective insulating film 23 between wiring lines W2 and W3. When the material forming the columnar spacer 27 has a property of blocking moisture, it may be filled in the slit 23h1 to form the moisture-proof member 29a.

In this embodiment, the moisture-proof member 29a formed in the slit 23h1 can block the entrance of moisture to the wiring lines W3, W4, W7, and W8 and the like. This can eliminate the fear of corrosion of the wiring lines W3, W4, W7, and W8 and the like. Since the entrance of moisture to the wiring line W4 can be further blocked, corrosion of the wiring lines W3 and W4 each having a large potential difference between adjacent wiring lines can be further reduced. Also, the same effects as those of the first embodiment can be obtained.

Accordingly, the liquid crystal display panel and method of manufacturing the liquid crystal display panel capable of narrowing the frame with a high product yield can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, among a plurality of wiring lines, a wiring line positioned on the outermost edge side of the array substrate 1 is set as an outermost wiring line. The outermost wiring line may be positioned on the side of the display region R1 with respect to the slit. This can further block the entrance of moisture to a plurality of wiring lines including the outermost wiring line.

The moisture-proof members 29a, 29b, and 29c may be made of a material other than the material forming the sealing member 51, the material forming the alignment film 28, and the material forming the columnar spacer 27. The material forming the moisture-proof members 29a, 29b, and 29c is not limited to an inorganic material, and the above-described effect scanning be obtained as long as this material is lower in moisture permeability than the protective insulating film 23 (organic insulating film).

The techniques according to the above-described embodiments are not limited to the above liquid crystal display panel, but are applicable to various liquid crystal display panels. The liquid crystal injection method is not limited to the drop injection method, and may be a vacuum injection method. Also, the techniques according to the above-described embodiments are applicable to a display panel other than the liquid crystal display panel.

What is claimed is:

1. A display panel comprising:
an array substrate comprising an inorganic insulating film that is provided above a substrate and positioned in a display region and a frame region surrounding the display region;
a first wiring line and a second wiring line that are formed at an interval on the inorganic insulating film and positioned in the frame region;
an organic insulating film that is provided above the inorganic insulating film, is positioned in the display region and the frame region and completely covers the first wiring line and the second wiring line;
a slit that is formed to extend through the organic insulating film between the first wiring line and the second wiring line, each portion of the slit being arranged parallel to at least one of the first wiring line and the second wiring line, each portion of the first wiring line and the second wiring line being outside of, and separated from, the slit, and the slit being filled with a moisture-proof member that is in contact with the inorganic insulating film; and
a counter substrate that is arranged to face the array substrate with a gap,
wherein
the first wiring line is adjacent to the second wiring line,
the first wiring line is a power supply wiring line positioned on a side of the display region with respect to the slit,
the second wiring line is a control signal wiring line positioned on an outer edge side of the array substrate with respect to the slit, and
the slit has a width of 5 to 10 μm.

2. The panel according to claim 1, further comprising a connection wiring line that is positioned on the frame region, covered with the inorganic insulating film, and crosses the slit,
wherein the second wiring line is electrically connected to the connection wiring line.

3. The panel according to claim 1, wherein the slit is formed to extend in a direction in which the first wiring line and the second wiring line run.

4. The panel according to claim 1, wherein
the organic insulating film includes another frame-like slit that is positioned on the outer edge side of the array substrate with respect to the first wiring line and the second wiring line and is formed to extend through the organic insulating film, and
the array substrate includes another moisture-proof member that is filled in the other slit and is in contact with the organic insulating film.

5. The panel according to claim 1, further comprising a sealing member that faces the frame region and bonds the array substrate and the counter substrate,
wherein the moisture-proof member is formed from part of the sealing member filled in the slit.

6. The panel according to claim 1, further comprising a sealing member that faces the frame region, bonds the array substrate and the counter substrate, and is in contact with the moisture-proof member,
wherein the moisture-proof member is formed from a material different from the sealing member.

7. The panel according to claim 6, further comprising a liquid crystal layer that is formed in a space surrounded by the array substrate, the counter substrate, and the sealing member,
wherein the array substrate further includes an inorganic alignment film that is formed in at least the display region and extend from the display region to a position facing the slit in the frame region, and
the moisture-proof member is formed from part of the inorganic alignment film filled in the slit.

8. The panel according to claim 6, wherein
the array substrate further includes a columnar spacer that keeps the gap between the array substrate and the counter substrate, and
the moisture-proof member is formed from a material forming the columnar spacer.

9. The panel according to claim 1, wherein the moisture-proof member is formed along the slit.

* * * * *